(12) United States Patent
Sabhapathy (10) Patent No.: US 8,992,171 B2
(45) Date of Patent: Mar. 31, 2015

(54) ENERGY EFFICIENT CLIMATE CONTROL SYSTEM FOR AN OFFSHORE WIND TURBINE

(75) Inventor: Peri Sabhapathy, Northville, MI (US)

(73) Assignee: Gamesa Innovation & Technology, S.L., Sarriguren (ES)

( * ) Notice: Subject to any disclaimer, the term of this patent is extended or adjusted under 35 U.S.C. 154(b) by 881 days.

(21) Appl. No.: 13/223,396

(22) Filed: Sep. 1, 2011

(65) Prior Publication Data

US 2013/0056989 A1    Mar. 7, 2013

(51) Int. Cl.
*F03D 9/00* (2006.01)
*F03D 11/00* (2006.01)

(52) U.S. Cl.
CPC ............. *F03D 11/00* (2013.01); *F05B 2240/95* (2013.01); *F05B 2260/20* (2013.01); *F05B 2260/64* (2013.01); *Y02E 10/722* (2013.01); *Y02E 10/726* (2013.01)
USPC .......................... 415/178; 415/121.2; 415/116

(58) Field of Classification Search
CPC ..... F03D 9/002; F03D 11/00; F03D 11/0025; F03D 11/005; F03D 11/0058; F03D 11/0075; F05B 2260/20; F05B 2260/64
USPC ................... 415/108, 114, 116, 121.2, 121.3, 415/175–178; 165/47; 290/44, 55
See application file for complete search history.

(56) References Cited

U.S. PATENT DOCUMENTS

| | | | |
|---|---|---|---|
| 6,439,832 B1 | 8/2002 | Siegfriedsen | |
| 6,520,737 B1 | 2/2003 | Fischer et al. | |
| 7,111,668 B2 | 9/2006 | Rurup | |
| 7,837,126 B2 | 11/2010 | Gao | |
| 2004/0041408 A1* | 3/2004 | Casazza | 290/55 |
| 2008/0290662 A1* | 11/2008 | Matesanz et al. | 290/44 |
| 2009/0289461 A1 | 11/2009 | Larsen | |
| 2010/0061853 A1* | 3/2010 | Bagepalli | 416/95 |
| 2012/0156053 A1 | 6/2012 | Stiesdal | |

FOREIGN PATENT DOCUMENTS

| | | |
|---|---|---|
| CA | 2 714 839 A1 | 3/2011 |
| CA | 2 762 423 A1 | 6/2012 |
| CN | 102536671 A | 7/2012 |
| EP | 2 466 128 A1 | 6/2012 |
| WO | 2010/069954 A1 | 6/2010 |

OTHER PUBLICATIONS espacenet English abstract of EP 2 466 128 A1.

* cited by examiner

*Primary Examiner* — Edward Look
*Assistant Examiner* — Maxime Adjagbe
(74) *Attorney, Agent, or Firm* — Ladas & Parry LLP (57) ABSTRACT

An energy efficient climate control system for an offshore wind turbine that is integrated with the component cooling system is disclosed. The climate control system includes a cooling circuit adapted to carry heat generated by a component of the nacelle to outside the nacelle. The climate control system also includes an airflow system adapted to receive a warm outflow of coolant from the cooling circuit, across a variable flow control valve, the airflow system supplying clean ambient air to the nacelle at a predetermined relative humidity. The variable flow control valve regulates a flow rate of the coolant through the airflow system to adjust the relative humidity of the air entering the nacelle.

19 Claims, 5 Drawing Sheets

ENERGY EFFICIENT CLIMATE CONTROL SYSTEM FOR AN OFFSHORE WIND TURBINE

BACKGROUND OF THE INVENTION

1. Field of the Invention

The present generally relates to an energy efficient climate control system for an offshore wind turbine that is integrated with the component cooling system.

2. Related Art

A wind turbine converts the kinetic energy of the wind into electrical energy through its rotor, drivetrain, electrical generator, and converter. An electrical transformer converts the low voltage output from the converter into a high voltage output before the output is sent to a substation at a wind farm. A wind turbine nacelle houses these mechanical and electrical components, namely, the drivetrain, the electrical generator, the converter, and the transformer (which is usually located in the nacelle to reduce power loss due to low voltage electrical transmission). The wind turbine nacelle also houses the components of the hydraulic system needed for blade pitching and nacelle yawing.

These components generate a significant amount of heat while the wind turbine is operating. For their protection and their efficient operation, the heat generated by these components has to be continuously removed. This is typically done by circulating a coolant such as a mixture of ethylene glycol and water through the heat exchangers built into these components. The coolant then transports the heat from these components and dissipates it to the ambient air with the help of air-cooled radiators mounted on the outside of the nacelle. The heat generated by the drivetrain, and that by the hydraulic system, is dissipated to the coolant through liquid-to-liquid heat exchangers in the lubricating oil and the hydraulic fluid sumps, respectively. Thus the wind turbine cooling system helps remove the heat generated by the components in the nacelle.

In addition to dissipating the heat to the coolant, the heat generating components of the wind turbine also dissipate a significant amount of heat from their outer surfaces to the air inside the nacelle. Moreover, the components such as the transformer dissipate the heat primarily to the surrounding air. Therefore, the air inside the nacelle needs to be either continuously replaced by fresh cooler air (an open airflow system) or cooled and re-circulated (a closed airflow system).

In a wind turbine with an open airflow system, the cooler ambient air usually enters through one or more inlets at the nacelle bottom and flows through the nacelle, thus removing heat from the outer surfaces of the heat generating components. The warmer air exits to the outside from the nacelle through one or more outlets at the nacelle top. The fans, typically located either at the inlets or the outlets, and other airflow control devices such as vanes, help regulate the airflow through the nacelle and thus remove the heat from the outer surfaces of the heat generating components.

In a turbine with a closed airflow system, the warmer air from the nacelle is transported to outside the nacelle or to the tower bottom and cooled through an air-to-air heat exchanger or through a chiller, and the cooler air is re-circulated through the nacelle. Fans or blowers and other flow control devices help circulate the airflow through the nacelle. Thus, the wind turbine climate control system helps cool the heat generating components of the turbine from the outside. An open airflow system is typically more economical and simpler to use than a closed airflow system.

SUMMARY OF THE INVENTION

The relative humidity of the ambient air is typically very high in an offshore environment. This can pose a major problem for an offshore wind turbine cooled with an open airflow system because the equipment corrosion rate increases exponentially with an increase in the relative humidity of air inside the turbine. That is the reason the International Electrotechnical Commission (IEC), which is the international body that sets the standards for the wind turbines worldwide, recommends that the relative humidity of the air inside an offshore wind turbine should be less than 70%. The IEC also suggests that this requirement for relative humidity of the air inside the wind turbine could be met by maintaining the air inside the turbine at a temperature about 5° C. higher than the ambient air temperature.

The present invention provides an energy efficient climate control system for an offshore wind turbine that is integrated with the component cooling system. It is an open airflow system and uses the waste heat from the component cooling system to warm and thereby lower the relative humidity of the air entering the nacelle. This can not only help meet the relative humidity requirements of the air inside the nacelle as per the IEC regulations, but can also help reduce the size of the air-cooled radiators that dissipate the heat from the coolant to the ambient air.

In the present invention, while the wind turbine is operating, its major components, namely, the drivetrain, the generator, the converter, and the transformer, generate a significant amount of heat. This heat is removed and dissipated to the ambient air, especially in large wind turbines, both by the circulation of a coolant such as a mixture of ethylene glycol and water through the components and by the airflow over these components. The present invention in one embodiment provides, for an offshore wind turbine, an energy efficient climate control system that is integrated with the component cooling system. The climate control system is an open airflow system with sufficient airflow through the nacelle to remove the heat dissipated from the outer surfaces of the heat generating components. The system also uses the heat carried by the coolant from one or more of these components to warm the air before the air enters the turbine.

This ensures that the relative humidity of the air throughout the nacelle is low, thus significantly minimizing the corrosion rate of the equipment inside the nacelle. This can also reduce the size of the radiator of that particular cooling circuit that dissipates the heat from the coolant to the ambient air, as part of the heat from the coolant is used to pre-heat the air entering the turbine. Thus, the wind turbine climate control system according to an embodiment of the present invention can function more energy efficiently while at the same time minimizing the equipment corrosion rate significantly.

The present invention according to one embodiment provides a climate control system for a wind turbine having a nacelle. The climate control system includes a cooling circuit adapted to carry heat generated by a component of the nacelle to outside the nacelle. The climate control system also includes an airflow system adapted to receive a warm outflow of coolant from the cooling circuit, across a variable flow control valve, the airflow system supplying clean ambient air to the nacelle at a predetermined relative humidity. The variable flow control valve regulates a flow rate of the coolant through the airflow system to adjust the relative humidity of the air entering the nacelle.

The present invention according to another embodiment provides a climate control method for a wind turbine having a nacelle. The method includes the steps of: receiving a warm outflow of coolant from a cooling circuit of a component of the nacelle; supplying clean ambient air to the nacelle at a predetermined relative humidity; and regulating a flow rate of the coolant to adjust to the predetermined relative humidity.

The present invention according to one embodiment provides a climate control method for a wind turbine having a nacelle. The method includes the steps of: removing waste heat from components of the nacelle and dissipating the waste heat to ambient air by circulating a coolant through the components and by the airflow over the components; and using the waste heat to warm and thereby lower the relative humidity of the air entering the nacelle.

The present invention according to another embodiment provides a climate control system for a wind turbine having a nacelle. The climate control system includes a plurality of cooling circuits adapted to carry heat generated by components of the nacelle to outside the nacelle. The climate control system also includes an airflow system comprising an air handling unit including a liquid-to-air heat exchanger adapted to receive a warm outflow of coolant from the coolant circuit connected to the drivetrain across a variable flow control valve, the air handling unit supplying clean ambient air to the nacelle at a specified relative humidity. The variable flow control valve regulates a flow rate of the coolant through the heat exchanger, thereby adjusting the temperature of the air entering the nacelle and thereby the amount of preheating of the air entering the nacelle and the relative humidity.

The present invention according to another embodiment provides a climate control system for a wind turbine having a nacelle and a tower. A plurality of cooling circuits is adapted to carry heat generated by components of the nacelle to outside the nacelle. A first duct is attached to the tower, and a second duct is coaxial with the first duct and is attached to the nacelle. An interface has a cylindrical bearing and is located between the ducts, the interface being adapted to enable the second duct to freely revolve around the first duct, wherein the axes of the ducts are coincident with the nacelle yaw axis. The climate control system also includes an airflow system comprising an air handling unit and a liquid-to-air heat exchanger. The air handling unit is located in a lower portion of the tower and is adapted to receive ambient air and supply the ambient air through the first duct and the second duct to the liquid-to-air heat exchanger. In the heat exchanger the air is preheated by warm coolant flow from the cooling circuit connected to the drivetrain across a hydraulic control valve, the heat exchanger supplying clean ambient air to the nacelle at a specified relative humidity. The hydraulic control valve regulates a flow rate of the coolant through the heat exchanger, thereby adjusting the temperature of the air entering the nacelle and thereby the amount of preheating of the air entering the nacelle and the relative humidity.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will be more readily understood from a detailed description of the exemplary embodiments taken in conjunction with the following figures.

The invention will next be described in connection with certain exemplary embodiments; however, it should be clear to those skilled in the art that various modifications, additions, and subtractions can be made without departing from the spirit and scope of the claims.

DETAILED DESCRIPTION OF THE PREFERRED EMBODIMENTS

The climate control system for an offshore wind turbine according to the present invention serves primarily two functions. The first is to keep the air temperature inside the wind turbine below a specified limit and thus help minimize the thermal failure of the turbine components. The second is to keep the relative humidity of the air inside the turbine below a specified value (e.g., 70% as per IEC regulations) and thus help minimize the corrosion rate of the turbine components.

As indicated earlier, while a wind turbine is operating, the outer surfaces of a number of wind turbine components inside the nacelle dissipate a significant amount of heat to the surrounding air inside the nacelle. The nacelle is typically made up of fiberglass, and, therefore, the heat lost from the nacelle outer walls to the ambient air is low. Thus, for an offshore wind turbine cooled with an open airflow system, the requirement on the relative humidity of the air inside the nacelle can be typically met by ensuring that the air entering the nacelle is at least 5° C. warmer than the ambient air. As the air flows through the nacelle, because of heat dissipation from various components inside the nacelle, the temperature of the air continuously increases, and, therefore, its relative humidity decreases. The warmer air finally exits the nacelle through one or more outlets in the nacelle.

Figure 1:
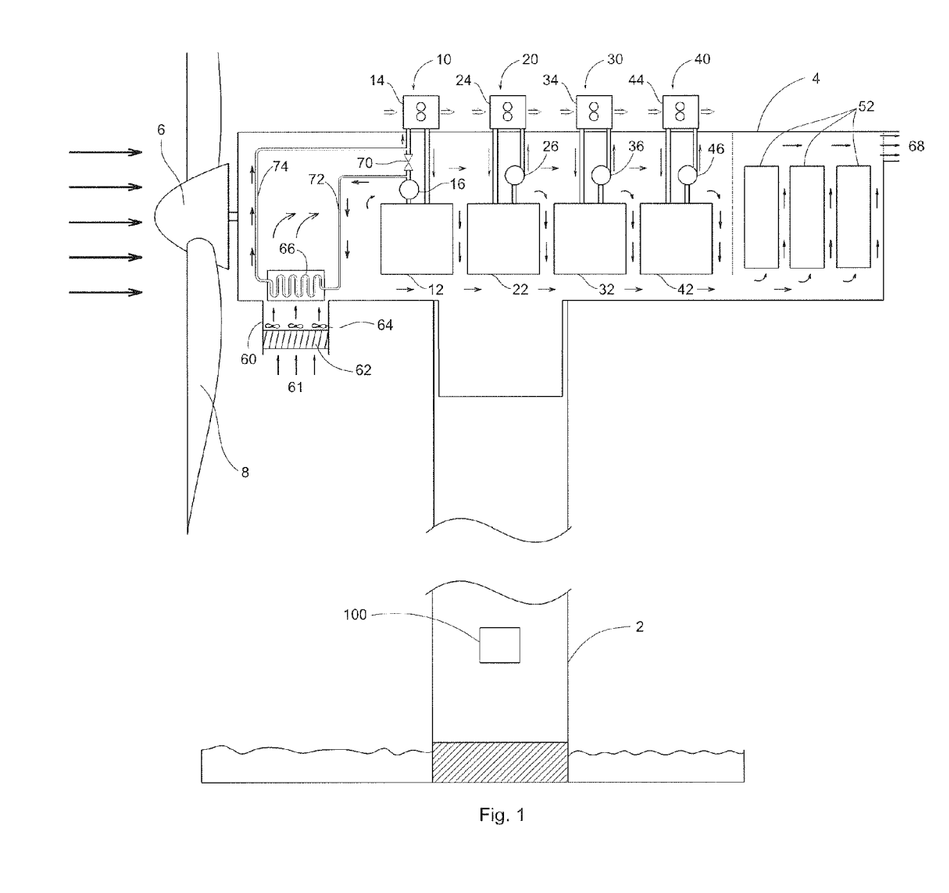
FIG. 1 shows a schematic of the climate control system of an offshore wind turbine along with the cooling system in accordance with a first embodiment of the present invention.

FIG. 1 shows a schematic of the climate control system of an offshore wind turbine along with the cooling system according to a first embodiment of the present invention. The offshore wind turbine consists of a tower 2, a nacelle 4, and a rotor 6 with blades 8. In the configuration shown in FIG. 1, the cooling system comprises cooling circuits 10, 20, 30, and 40 that carry the heat generated by the drivetrain 12, the generator 22, the hydraulic system 32, and the converter 42, respectively, to outside the nacelle, and dissipate the heat to the ambient air through air cooled radiators 14, 24, 34, and 44, respectively. Pumps 16, 26, 36, and 46 circulate the coolant in the cooling circuits 10, 20, 30, and 40, respectively.

The climate control system has an air handling unit 60 at the nacelle front bottom that helps supply clean ambient air to the nacelle 4 at a relative humidity that can be well below 70%. This is accomplished by the components of the air handling unit 60, namely, the air inlet 61, the air filter 62, the fan 64, and the liquid-to-air heat exchanger 66. The heat exchanger 66 is connected to the warm outflow of the coolant from the drivetrain 12 in the drivetrain cooling circuit 10 across the variable flow control valve 70 to the coolant flow pipes 72 and 74. The valve 70 controls the coolant flow rate through the heat exchanger 66, and, thereby, the amount of preheating of the air entering the nacelle 4. The climate control system is thus connected to the cooling system through the heat exchanger 66. Though the air inlet 61 in the air handling unit 60 is shown as pointing down the nacelle 4 in FIG. 1, the air inlet 61 can also be directed towards the wind to take advantage of the dynamic pressure of the wind.

When the turbine is operating, the climate control system functions as follows. The dynamic pressure of the wind and the fan 64 force the ambient air through the air inlet 61. The filter 62 helps remove the airborne water droplets, dust, and salt particles. The coolant flowing through the liquid-to-air heat exchanger 66 pre-heats the clean air out of the filter 62 before the air enters the nacelle 4. By regulating the coolant flow rate through the heat exchanger 66, the temperature of the air entering the nacelle 4 can be adjusted, and, thus, the relative humidity of the air entering the nacelle 4. If the ambient air has a high relative humidity, the coolant flow rate through the heat exchanger 66 will be adjusted to be high so that the air entering the nacelle 4 has a low relative humidity. If the ambient air has a low relative humidity, the coolant flow rate through the heat exchanger 66 will be allowed to be low.

Once inside the nacelle 4, the air flows over the drivetrain 12, the generator 22, the components of the hydraulic system 32, the converter 42, and the transformer 52, and thereby removes the heat from the outer surfaces of these components. Finally, the warm air exits the nacelle 4 through the outlet 68. The airflow and its distribution inside the nacelle 4 can be adjusted by additional flow distribution devices and fans (not shown) inside the nacelle 4. The nacelle 4 is typically made up of fiberglass and is sealed fairly well. Since the heat loss from the outer surfaces of the nacelle 4 to the ambient air and to the environment is fairly low, and heat is continuously added to the air inside the nacelle 4, the air temperature continually increases as the air flows from the inlet 61 to the outlet 68. As a result, the relative humidity of the air inside the nacelle 4 is below the relative humidity of the air entering the nacelle 4, and, thus, the climate control system helps minimize the corrosion rate of the components inside the nacelle 4. One added advantage of using the waste heat from the drivetrain cooling circuit 10 to warm the air entering the turbine is that it can reduce the size of the radiator 14, even if slightly.

In the climate control and cooling system configuration shown in FIG. 1, under normal turbine operating conditions, there is not much airflow into or out of the tower 2, and thus it is stagnant. Therefore, the relative humidity of the air inside the tower 2 can easily be maintained low by using a small off the shelf dehumidifier 100. This dehumidifier is on only when the relative humidity of the air inside the tower increases above the specified limit.

Figure 2:
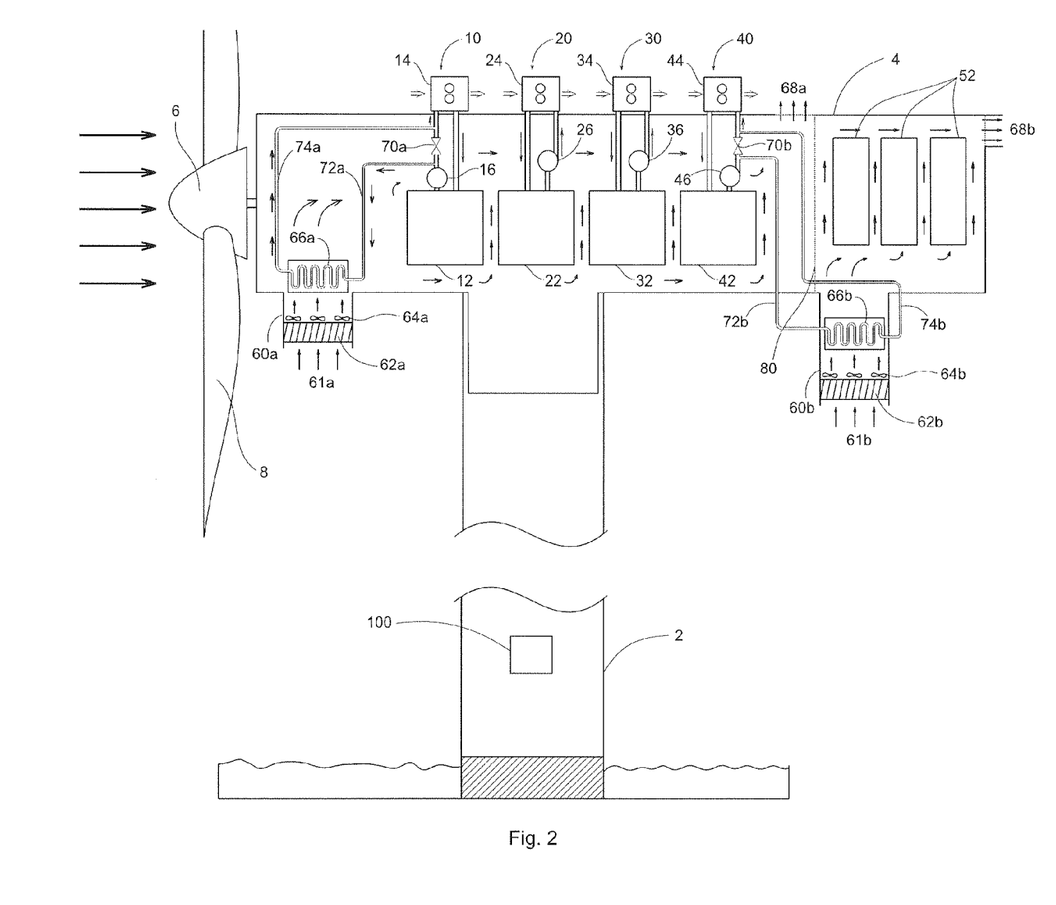
FIG. 2 shows a schematic of a second embodiment of a climate control system according to the present invention.

FIG. 2 shows a schematic of a second embodiment of the climate control system according to the present invention, having two airflow systems through the nacelle 4. In this case, a wall 80 between the converter 42 and the transformer 52 separates the nacelle 4 into two sections. The first airflow system comprises an air handling unit 60*a* with its components, namely, the air inlet 61*a*, the filter 62*a*, the fan 64*a*, and the liquid-to-air heat exchanger 66*a*, and the air outlet 68*a*. This airflow system is similar to that described previously in FIG. 1 except that the air exits the nacelle 4 through the outlet 68*a* immediately after it flows over the converter 42. The heat exchanger 66*a* is connected to the coolant outflow from the drivetrain across the flow control valve 70*a* in the cooling circuit 10 through the pipes 72*a* and 74*a*.

As discussed previously, the relative humidity of the air entering the nacelle through the air handling unit 60*a* can be lowered by regulating the coolant flow through the heat exchanger 66*a*. Thus, the first airflow system helps maintain the relative humidity of the air inside the section of the nacelle 4 that houses the drivetrain 12, the generator 22, the hydraulic system 32, and the converter 42. The second airflow system comprises the air handling unit 60*b* located below the transformer 52. The unit 60*b* in turn consists of the air inlet 61*b*, the filter 62*b*, the fan 64*b*, and the liquid-to-air heat exchanger 66*b*. The air outlet 68*b* is at the nacelle rear top, above the transformer. The liquid-to-air heat exchanger 66*b* is connected to the warm coolant outflow from the converter 42 through the pipes 72*b* and 74*b* across the hydraulic control valve 70*b*. The valve 70*b* regulates the coolant flow through the heat exchanger 66*b*, and thus ensures that the relative humidity of the air entering the transformer section is below the allowable limit. As the air flows over the transformer, it removes heat from the outer surfaces of the transformer 52. The warm air finally exits the transformer section of the nacelle 4 through the outlet 68*b*. Thus, the second airflow system helps maintain the temperature and the relative humidity of the air in the transformer section 52 of the nacelle 4. As discussed previously, the relative humidity of the mostly stagnant air inside the tower 2 can easily be controlled low by using a small off-the-shelf dehumidifier 100.

Figure 3:
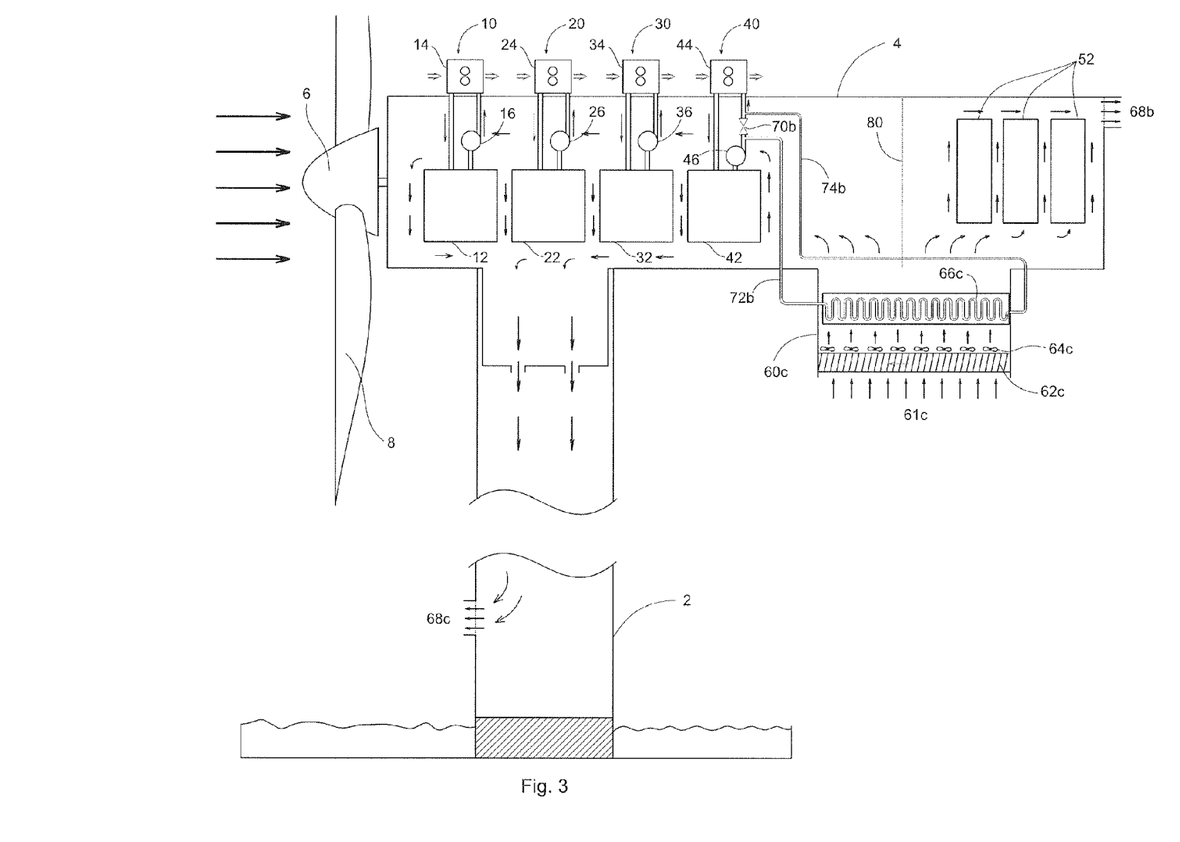
FIG. 3 shows a schematic of a third embodiment of a climate control system according to the present invention.

FIG. 3 shows a schematic of a third embodiment of the climate control system with a two airflow systems through the turbine. As in the second embodiment, a wall 80 between the converter 42 and the transformer 52 separates the nacelle 4 into two sections. In this configuration, an air handling unit 60*c* is located below the converter 42 and the transformer 52. The air handling unit 60*c* along with its components, namely, the air inlet 61*c*, the filter 62*c*, the fan 64*c*, and the liquid-to-air heat exchanger 66*c* supply clean, low relative humidity air to both airflow systems. The heat exchanger 66*c* is connected to the warm coolant outflow from the converter 42 across the hydraulic valve 70*b* through the pipes 72*b* and 74*b*. As discussed previously, the warm coolant flow through the heat exchanger 66*c* can ensure that the relative humidity of the air entering the turbine is below the allowable limit.

As in FIG. 2, in the second airflow system, the warm air from the transformer section 52 exits through the outlet 68*b* at the nacelle rear top, above the transformer area. In the first airflow system, the air flows over the remaining major heat generating components of the turbine, namely, the converter 42, the components of the hydraulic system 32, the generator 22, and the drivetrain 12. The warmer air then flows down the tower 2 and exits through the outlet 68*c* at the tower bottom. A major advantage of this airflow configuration is that the warm air flowing down the tower 2 keeps the relative humidity of air inside the tower 2 below the acceptable limit while the turbine is operating. No additional dehumidifier in the tower area is needed. Thus, the first airflow system helps maintain the relative humidity of the air inside the section of the nacelle 4 that houses the drivetrain 12, the generator 22, the hydraulic system 32, and the converter 42, and the air inside the tower 2. The second airflow system helps maintain the temperature and the relative humidity of the air in the transformer area of the nacelle 4.

Figure 4:
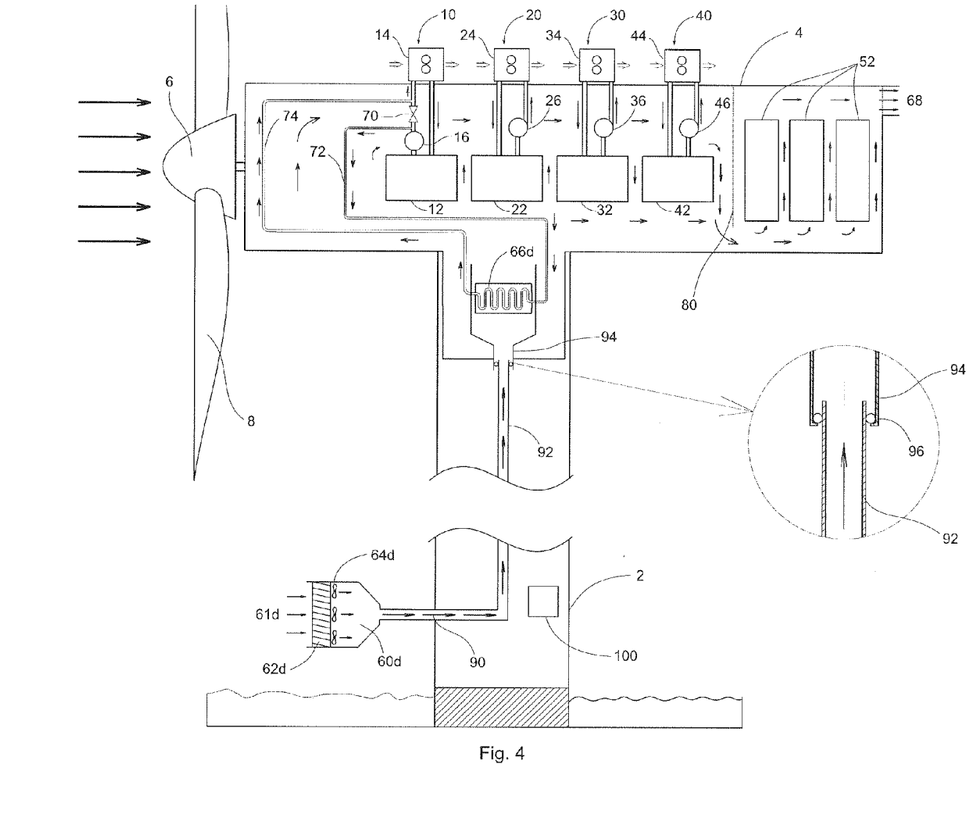
FIG. 4 shows a schematic of a fourth embodiment of a climate control system according to the present invention.

FIG. 4 shows a schematic of a fourth embodiment of the climate control system according to the present invention. This embodiment is similar to the first embodiment except that the air handling unit 60*d* is at the bottom of the tower 2. The ambient air enters the air handling unit 60*d* through the inlet 61*d*. The air filter 62*d* removes the water droplets, salt particles, and dust. The clean air then enters the tower through the inlet 90. The fan 64*d* helps force the airflow through the duct 92 up to the lower nacelle 4. The air then flows through the duct 94 that is co-axial with the duct 92. The insert in FIG. 4 shows the details of the interface between the duct 94 and the duct 92 (of course, this is just an example of the interface, and the present invention is not limited to the details shown). The axes of the duct 94 and duct 92 are coincident with the nacelle yaw axis. The duct 92 and the duct 94 are attached to the tower 2 and to the nacelle 4, respectively. As the nacelle yaws to direct the blades towards the wind direction, the duct 94 freely revolves around the duct 92 with the help of the cylindrical bearing 96.

From the duct 94, the air flows through a liquid-to-air heat exchanger 66*d* where it is preheated by warm coolant flow from the drivetrain cooling circuit 10. The heat exchanger 66*d* is connected to the warm outflow of the coolant from the drivetrain 12 in the drivetrain cooling circuit 10 across the hydraulic control valve 70 through the coolant flow pipes 72 and 74. The valve 70 controls the coolant flow rate through the heat exchanger 66*d*. As before, the valve 70 controls the coolant flow rate through the heat exchanger 66*d* and, thus, the amount of preheating and thereby the relative humidity of the air leaving the heat exchanger 66*d*. The air then flows through the nacelle 4 thus removing the heat dissipated by the outer surfaces of the drivetrain 12, the generator 22, the hydraulic system 32, the converter 42, and the transformer 52. The warm air finally exits the nacelle 4 through the outlet 68 at the nacelle rear top. The airflow and its distribution inside the nacelle 4 can be adjusted by additional flow distribution devices and fans (not shown) inside the nacelle 4.

Figure 5:
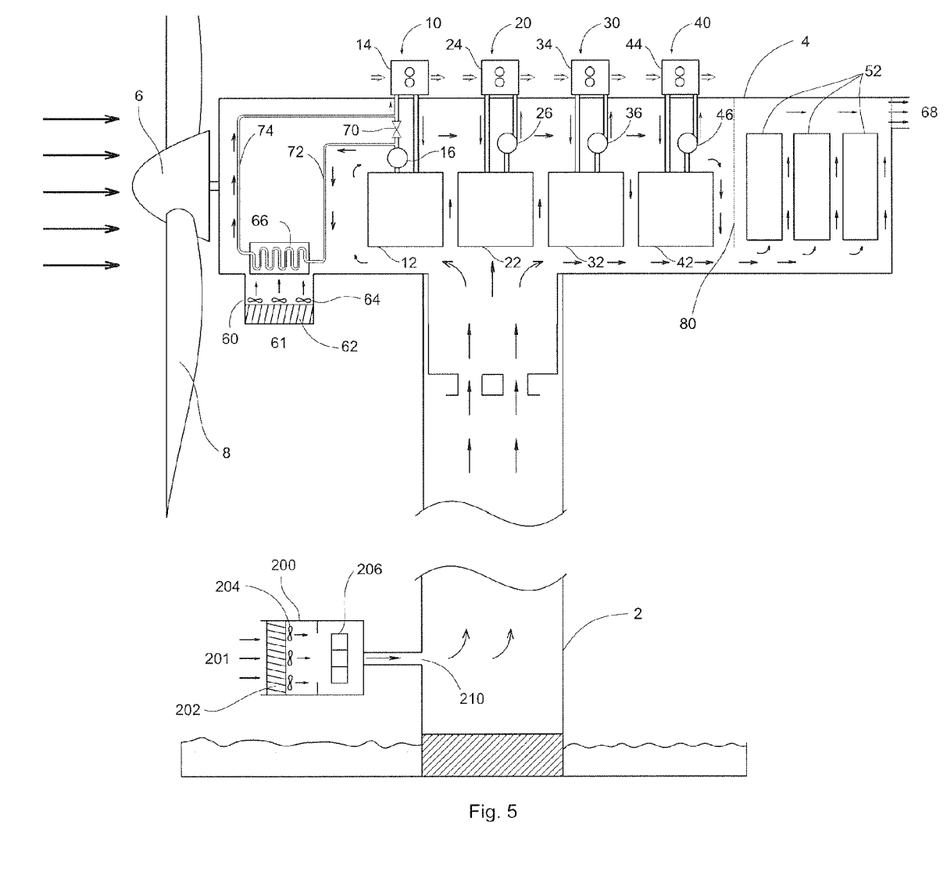
FIG. 5 shows a supplementary airflow system according to an embodiment of the present invention.

It is important to ensure that the relative humidity of the air inside the offshore wind turbine is always below the specified limit to minimize the component corrosion rate even when the turbine is not operating. When the turbine is shut down, there is no waste heat available from the power generating components. As a result, the air inside the turbine can cool down if the ambient air temperature decreases, especially during cold nights. Therefore, the relative humidity of the air inside the turbine can increase and thus increase the equipment corrosion rate. A supplementary airflow system, an embodiment of which is shown in FIG. 5 according to the present invention, can be used to lower the relative humidity of the air inside the turbine and thus help lower the equipment corrosion rate during turbine shutdown. The supplementary airflow system is shown in FIG. 5 along with the climate control system shown in FIG. 1. As indicated previously, the relative humidity of the mostly stagnant air inside the tower 2 can easily be controlled low by using a small off-the-shelf dehumidifier 100.

Since the turbine is in shut down mode, the air handling unit 60, and, in particular, the air inlet 61, is closed down and therefore no air enters the nacelle 4 through this inlet 61. The supplementary airflow system comprises an air handling unit 200 that includes the air inlet 201, the air filter 202, the fan 204, the supplementary heater 206 at the bottom of the tower 2 and the air outlet 68 at the nacelle rear top. The clean air at the specified relative humidity enters the turbine at the tower bottom through the inlet 210. As in the previous airflow configurations, the airborne water droplets and salt particles are removed, and the clean air is warmed by the auxiliary heater 206 to lower the relative humidity of the air before the air enters the turbine at the tower bottom. The thermal energy of the auxiliary heater could come from an electrical power source or from another means, for example, by burning a fossil fuel. The air then flows up the tower 2, through the nacelle 4, and exits through the air outlet 68. Thus, the supplementary airflow system can ensure that the relative humidity of air inside the tower and the nacelle 4 is below the specified value when the turbine is in a shut down mode.

Another option to maintain the relative humidity of the air both inside the nacelle 4 and inside the tower 2, when the turbine is shut down, is to use an off the shelf dehumidifier. This off the shelf dehumidifier was part of the proposed embodiments of the climate control system shown in FIGS. 1, 2, and 4, and it is for maintaining the relative humidity of the air in the tower section. In this case, the turbine air inlets and outlets are closed and the air from the nacelle 4 is circulated through the tower section so that its relative humidity can be lowered by the dehumidifier.

It is noted that the turbine climate control and the coolant flow systems shown in FIGS. 1-5 are only examples to illustrate the idea behind the invention of using the waste heat to meet the airflow and the air relative humidity requirements of the turbine and thus minimize the equipment corrosion rate. The present invention is of course not limited thereto, and there are many other possibilities of combining the airflow and the coolant flow configurations to achieve the desired objectives of removing the heat from heat dissipating components of the turbine and maintaining the temperature and the relative humidity of the air inside the turbine blow the specified values. Additional possibilities include, but are not limited to, combining one or more of the cooling circuits in FIG. 1-4 (e.g., combining cooling circuits 10 and 20) or having more air inlets and outlets, or warming the inlet air with the warm coolant from a different cooling circuit (e.g., the inlet air can be warmed by the coolant from the generator cooling circuit 20 instead of from the drivetrain cooling circuit 10 as shown in FIG. 1). An electric water heater can also be installed along the inlet pipe 72 in FIG. 1 to help with the preheating of the air entering the nacelle 4 when the coolant outflow from the drivetrain 12 is not sufficiently warm. This could be encountered immediately after a turbine cold start-up.

While the wind turbine cooling and climate control system of the present invention has been described herein is being directed to an offshore installation, it can also be used in an onshore installation. At an onshore turbine installation, the relative humidity of the ambient air is typically low. Therefore, corrosion of components due to humidity is typically not a problem when an open airflow system is used to remove the heat from the outside surfaces of components inside the turbine. However, if the turbine is located on land but, for example, near a sea (or a large body of water such as a large lake), the relative humidity of ambient air can be high. And the corrosion due to humidity does tend to become a problem when an open airflow system is used to cool the outside surfaces of components inside the turbine. The climate control system of the present invention can be used for these turbines. In an offshore installation, the relative humidity of ambient air is typically high. Moreover, the salt concentration in the air is also typically high. Therefore, corrosion due to humidity can be a major problem when an open airflow is used to cool the outside surfaces of components inside the turbine. Thus, there is a need to lower the relative humidity of air entering the turbine.

While various embodiments of the present invention have been described above, it should be understood that they have been presented by way of example, and not limitation. It will be apparent to persons skilled in the relevant ail(s) that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

Having described the invention, what is claimed as new and secured by Letters Patent is:

1. A climate control system for a wind turbine having a nacelle, comprising:
    a cooling circuit adapted to carry heat generated by a component of the nacelle to outside the nacelle; and
    an airflow system adapted to receive a warm outflow of coolant from the cooling circuit, across a variable flow control valve, the airflow system supplying clean ambient air to the nacelle at a predetermined relative humidity,
    wherein the variable flow control valve regulates a flow rate of the coolant through the airflow system to adjust the relative humidity of the air entering the nacelle.

2. A climate control method for said climate control system according to claim 1, comprising the steps of:
    removing waste heat from a component of the nacelle and dissipating the waste heat to ambient air by circulating a coolant through the component and by the airflow over the component; and
    using the waste heat to warm and thereby lower the relative humidity of the air entering the nacelle and thus minimizing corrosion of the component inside the turbine.

3. A climate control system for a wind turbine having a nacelle, comprising:
    a plurality of cooling circuits adapted to carry heat generated by components of the nacelle to outside the nacelle, the components including a drivetrain;
    an airflow system comprising an air handling unit including a liquid-to-air heat exchanger adapted to receive a warm outflow of coolant from the coolant circuit connected to the drivetrain across a variable flow control valve, the air handling unit supplying clean ambient air to the nacelle at a specified relative humidity,
    wherein the variable flow control valve regulates a flow rate of the coolant through the heat exchanger, thereby adjusting the temperature of the air entering the nacelle and thereby the amount of preheating of the air entering the nacelle and the relative humidity.

4. The system of claim 3, wherein the plurality of cooling circuits dissipate the heat to ambient air through a plurality of respective air cooled radiators.

5. The system of claim 3, further comprising a plurality of pumps, adapted to circulate coolant in the plurality of cooling circuits, respectively.

6. The system of claim 3, wherein the air handling unit further comprises:
    an air inlet;
    an air filter adapted to remove airborne water droplets, dust, and salt particles from the ambient air forced through the air inlet; and
    a fan,
    wherein
    the ambient air is forced through the air inlet by wind pressure and the fan and is then delivered to the heat exchanger, and
    the coolant flowing through the heat exchanger pre-heats clean air out of the filter before the air enters the nacelle.

7. The system of claim 6, wherein the air inlet is directed towards the wind.

8. The system of claim 3, wherein the air handling unit is located at a front bottom of the nacelle.

9. The system of claim 3, wherein the air supplied to the nacelle from the air handling unit flows over the components of the nacelle, thereby removing heat from outer surfaces of the components before exiting the nacelle through an outlet.

10. The system of claim 3, further comprising a dehumidifier adapted to maintain the relative humidity of the air inside the tower of the wind turbine, wherein the dehumidifier is controlled to be in operation only when the relative humidity of the air inside the tower increases above a specified limit.

11. The system of claim 3,
    wherein the components further include a generator, a hydraulic system, a converter, and a transformer,
    the system further comprising a wall between the converter and the transformer thereby separating the nacelle into two sections,
    wherein the airflow system is a first airflow system for maintaining the relative humidity of the air inside the section of the nacelle that houses the drivetrain, the generator, the hydraulic system, and the converter,
    the system further comprising a converter outlet through which air exits the nacelle immediately after it flows over the converter;
    the system further comprising a second airflow system for maintaining the relative humidity of the section of the nacelle that houses the transformer, the second airflow system comprising:
    a second air handling unit located below the transformer and including a second liquid-to-air heat exchanger adapted to receive a warm outflow of coolant from the cooling circuit connected to the converter across a hydraulic control valve, the second air handling unit supplying clean ambient air to the transformer section of the nacelle at a specified relative humidity,
    wherein the hydraulic flow control valve regulates a flow rate of the coolant through the second heat exchanger, thereby adjusting the temperature of the air entering the transformer section of the nacelle and thereby the amount of preheating of the air entering the transformer section of the nacelle and the relative humidity.

12. The system of claim 11, wherein the second air handling unit comprises:
    a second air inlet;
    a second air filter adapted to remove airborne water droplets, dust, and salt particles from the ambient air forced through the second air inlet; and
    a second fan,
    wherein
    the ambient air is forced through the second air inlet by wind pressure and the second fan and to the second heat exchanger, and
    the coolant flowing through the second heat exchanger pre-heats clean air out of the filter before the air enters the section of the nacelle housing the transformer.

13. The system of claim 12, wherein the air supplied to the transformer section of the nacelle from the second air handling unit flows over the transformer, thereby removing heat from outer surfaces of the transformer before exiting the nacelle through a second outlet.

14. A climate control system for a wind turbine having a nacelle and a tower, comprising:

a plurality of cooling circuits adapted to carry heat generated by components of the nacelle to outside the nacelle, wherein the components include a drivetrain;

a first duct attached to the tower;

a second duct coaxial with the first duct and attached to the nacelle;

an interface having a cylindrical bearing and located between the ducts, the interface adapted to enable the second duct to freely revolve around the first duct, wherein axes of the ducts are coincident with the nacelle yaw axis;

an airflow system comprising an air handling unit and a liquid-to-air heat exchanger, wherein the air handling unit is located in a lower portion of the tower and is adapted to receive ambient air and supply the ambient air through the first duct and the second duct to the liquid-to-air heat exchanger, wherein in the heat exchanger the air is preheated by warm coolant flow from the cooling circuit connected to the drivetrain across a hydraulic control valve, the heat exchanger supplying clean ambient air to the nacelle at a specified relative humidity, and wherein the hydraulic control valve regulates a flow rate of the coolant through the heat exchanger, thereby adjusting the temperature of the air entering the nacelle and thereby the amount of preheating of the air entering the nacelle and the relative humidity.

15. The system of claim 14, wherein the air supplied to the nacelle from the air handling unit flows over the components of the nacelle, thereby removing heat from outer surfaces of the components before exiting the nacelle through an outlet.

16. The system of claim 3, further comprising a dehumidifier adapted to maintain the relative humidity of the air inside the nacelle and the tower of the wind turbine when the turbine is shut down, wherein inlets and outlets of the turbine are closed and the air from the nacelle is circulated through the tower so that the relative humidity of the air is lowered by the dehumidifier.

17. The system of claim 3, further comprising a supplementary airflow system for lowering the relative humidity of the air inside the turbine during turbine shutdown, the supplementary airflow system comprising:

a second air handling unit including:

an air inlet for receiving clean air at the specified relative humidity, an air filter, a fan, an auxiliary heater located at a bottom section of the tower, and adapted to remove airborne water droplets and salt particles and to warm the clean air to lower the relative humidity of the air before the air enters the turbine at the tower bottom, wherein the air flows up the tower, through the nacelle and exits through an air outlet located at a rear top section of the nacelle.

18. A climate control method for said climate control system according to claim 3, comprising the steps of:

removing waste heat from components of the nacelle and dissipating the waste heat to ambient air by circulating a coolant through the components and by the airflow over the components; and using the waste heat to warm and thereby lower the relative humidity of the air entering the nacelle and thus minimizing corrosion of the components inside the turbine.

19. A climate control method for said climate control system according to claim 14, comprising the steps of:

removing waste heat from components of the nacelle and dissipating the waste heat to ambient air by circulating a coolant through the components and by the airflow over the components; and using the waste heat to warm and thereby lower the relative humidity of the air entering the nacelle and thus minimizing corrosion of the components inside the turbine.

* * * * *